Inventor
Arthur C. Ruge
By
Attorney

United States Patent Office 3,178,938
Patented Apr. 20, 1965

3,178,938
TEMPERATURE COMPENSATION FOR CONDITION RESPONSE OF A CONDITION-RESPONSIVE NETWORK
Arthur C. Ruge, Lexington, Mass., assignor to Baldwin-Lima-Hamilton Corporation, Philadelphia, Pa., a corporation of Pennsylvania
Continuation of application Ser. No. 101,446, Apr. 7, 1961. This application June 12, 1964, Ser. No. 375,427
4 Claims. (Cl. 73—141)

This application is a continuation of my copending application Serial No. 101,446, filed April 7, 1961, now abandoned.

This invention relates to the temperature compensation of an electrical impedance strain gage transducer the uncompensated calibration of which varies with temperature to an undesirable extent. As an example of such transducer, but by no means limiting the scope of my invention, consider Ruge U.S. Patent No. 2,561,318 which shows a load cell, or load transducer, of the so-called bonded filament strain gage type. In such a transducer, the calibration of the electrical strain gage output is governed largely by the elastic properties of the load-carrying element which is normally made of metal. It is characteristic of nearly all metals and alloys that their Young's modulus of elasticity varies somewhat with temperature, the modulus becoming smaller as the temperature increases. The result of this thermoelastic effect is that in a load transducer such as that shown in FIG. 1 of that patent, the calibrated output in response to load will be found to increase with temperature; for most useful metals the rate of increase is between 1 and 2% per 100° F.

Similar, but normally smaller, effects are produced by the variation of electrical resistance of one or more impedance elements of an electrical strain gage circuit in response to temperature. Also, variation of sensitivity ("gage factor" as it is often called) with temperature frequently plays some part in the observed change in transducer calibration with temperature. There obviously can be other factors, such as change of cable impedance with temperature, etc. which may contribute to the effect.

Now, in common practice today, the various effects of temperature upon the transducer's calibrated output are arbitrarily lumped together under the term "modulus effect," simply because modulus variation is normally the dominant factor, and the corresponding compensation is commonly referred to as "modulus compensation" and will be so designated herein. It will, therefore, be understood that the application of the present invention extends to any electrical transducer in which the calibrated response is brought about by a condition-responsive change in electrical impedance and in which it is desired to introduce a change in the calibrated response as a function of temperature for purposes of compensation. Such compensation of the transducer may, for example, be partly or wholly for the purpose of correcting for a device external of the transducer, such as its measuring instrument.

It is an object of my present invention to provide improved means for effecting the "modulus" compensation of a transducer in such a way that accurate adjustment of the compensation is easily and economically made.

It is a further object to improve the performance of the compensated transducer under conditions of varying or non-uniform temperature and thus to minimize the necessity for "pampering" the transducer when used in the field by the excessive employment of thermal lagging, heat shields, and the like which has been necessary in the past for accurate work.

Similarly, it is an object of my invention to markedly reduce the cost of shop and laboratory calibration versus temperature because of the reduced amount of "pampering" required.

Other objects and advantages will be more apparent to those skilled in the art from the following description of the accompanying drawings in which.

Figure 1:
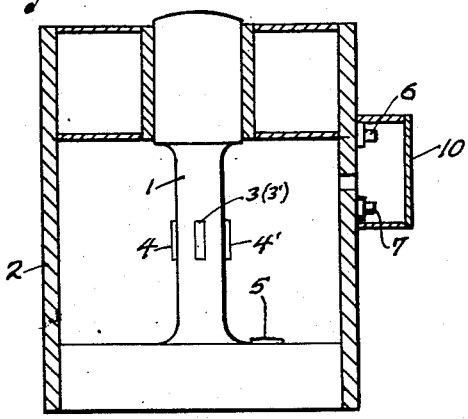
FIG. 1 is a diagrammatic sectional view of a load cell, or transducer.
Figure 2:
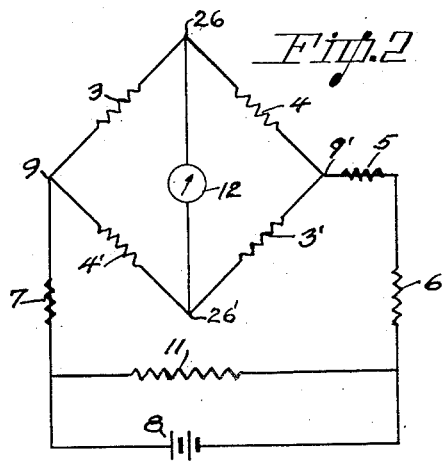
FIG. 2 is a wiring diagram, showing a commonly-used modulus compensation arrangement.

In order to understand how I accomplish the objects of my invention a brief explanation of former modulus compensation practice needs to be given. FIGS. 1 and 2 show a practical arrangement commonly used for modulus compensation of precision-type load transducers. A load-sensing element 1 is supported and protected by a case 2 (in accordance with the teaching of Ruge U.S. Patent No. 2,561,318). Impedance elements such as strain gages of the bonded electrical resistance filament type are mounted on element 1 so that gages 3, 3' respond to axial strain in the element and gages 4, 4' respond to lateral strain arising from the Poisson effect. The gages are mounted, preferably, on opposite sides of the column 1, although broadly, a single condition responsive impedance element could be used. A temperature-responsive electrical resistance element or "modulus gage" is shown for illustrative purposes as being attached to the base of the transducer in a region of low stress near to element 1. Element 5 may if desired be attached to or merely placed close to the gaged portion of element 1. Since one purpose of this invention is to provide condition-responsive apparatus having a desired relation between the temperature at a given location and the response of an included electrical network to a condition to be measured, it is only necessary to so locate the temperature-sensitive element such as 5 that will experience substantially the temperature at the given location. For typical "modulus" compensation the material of gage 5 is preferably chosen to have a relatively high positive coefficient of electrical resistance, such as nickel.

FIG. 2 shows one common circuit arrangement for such a transducer. Gages 3, 3', 4, 4' are connected into a Wheatstone bridge circuit having a power source 8 and an unbalance indicator 12. Modulus gage 5 is connected in series with source 8, the result being that as the temperature increases the resistance of element 5 increases thereby reducing the voltage appearing at bridge terminal 9, 9', thus tending to offset the increase in output discussed earlier in this disclosure.

For load transducers requiring only moderate accuracy the resistance characteristics of modulus gage 5 may be predetermined closely enough and no further compensation is needed. In the case of precision grade transducers, however, there is sufficient variation from unit to unit that an "average" modulus compensating gage is not close enough. The practice in the past has always been to predetermine element 5 so that an under-compensation results. Then, upon calibrating the unit at two or more temperatures, an additional modulus compensator or "modulus trim" 6 is added in series with element 5 to bring about the desired degree of compensation. This additional element 6 is normally located in a receptacle box 10 as a matter of convenience, or it may be placed somewhere within the cell casing 2. Final adjustment of the calibration is achieved by a fixed resistor 7, also connected in series with element 5. A second fixed resistor 11 is added in shunt with the power source 8 when it is required to adjust the terminal resistance to a predetermined value.

Now the disadvantages of the former means of refining the modulus compensation are (1) the preparation of element 6 involves winding a special resistor for each load cell, great care being taken to measure its resistance at a precisely known temperature since it is in effect a resistance thermometer; (2) unless perfectly uniform and steady temperature prevails throughout the cell, the temperature of element 6 is not necessarily the same as that of the gaged portion of load element 1. The first disadvantage is primarily related to economics; the second is of vital concern to the user of the cell who may not be able to provide the temperature conditions required for precision measurement. This would be especially true in field measurement of rocket weight and thrust.

Figure 3:
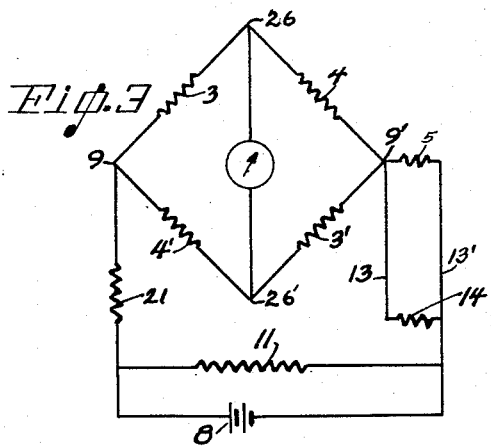
FIG. 3 is a wiring diagram illustrating my improved modulus compensating arrangement.

FIG. 3, in conjunction with FIG. 1, illustrates the application of the present invention to a precision load transducer of the type shown in FIG. 2. In my invention, "modulus gage" 5 is predetermined to result in an overcompensation if used by itself, not an undercompensation as heretofore. An extra lead wire 13 is brought out of the transducer casing and a shunting resistor 14 is applied across element 5. The resistor 14 is preferably made of a low temperature-coefficient wire so that its own temperature is of no practical significance to the operation of the device. The shunting effect of resistor 14 makes it possible to reduce the effective compensation of element 5 to any desired value.

In practice, the transducer is calibrated at two or more temperatures and the value of shunt 14 is calculated (or it can be experimentally determined if desired). I have found it convenient to make the resistance of modulus gage 5 about 20 to 25% higher than it needs to be for perfect compensation alone. This results in convenient values for shunt 14 the tolerance of which needs to be only ±3% for very precise modulus compensation. If the overcompensation amounts to 10 to 15% the shunt tolerance needs to be only ±8%.

This means that an assortment of ready-made fixed resistors may be used, thus eliminating the need for winding specials. Thus, if shunt 14 should be 126 ±3 ohms in a given case, one would combine a 120 and a 6 ohm value, each being accurate to ±1½ ohms.

Since resistor 14 is not sensibly temperature responsive, it may be located in any desired position such as in receptacle box 10 of FIG. 1 or even at or in the measuring instrument. In some applications this latter location may be very advantageous since the user can then make any fineness of compensation adjustment without going into the cell. Such a case may arise if the user requires extremely close modulus compensation over a specific range of temperature rather than the "best-fit" compensation normally made by the manufacturer over some different temperature range.

I can also perform the function of reducing the overcompensation of element 5 in FIG. 3 by adding suitable fixed series resistance 21, omitting shunt 14, or I can employ both 21 and 14 in combination. As a practical matter, I prefer to use both 21 and 14, with 14 chosen so as to play the dominant role in modulus compensation and 21, acting predominantly as the final calibration adjustment, playing a minor role in the modulus compensation. The shunt 11 is normally employed for the purpose of bringing the power terminal resistance to a desired convenient value.

Figure 4:
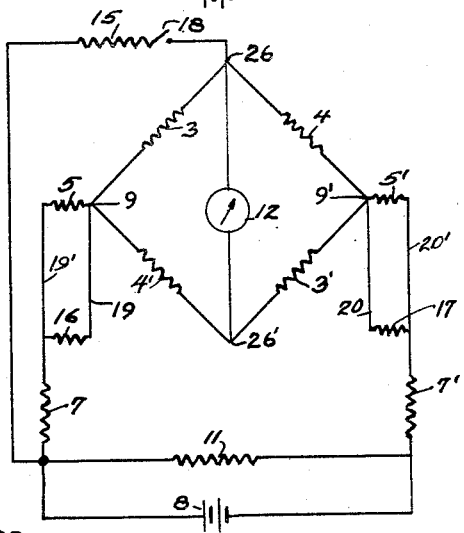
FIG. 4 is a wiring diagram illustrating my invention applied to some precision transducers for measuring force, torque, or fluid pressure.

For some precision transducers for measuring force, torque, or fluid pressure, the circuit of FIG. 4 is often employed. Referring to FIG. 1 for purposes of explanation, the modulus gage is "split" into two parts 5 and 5' which are usually made equal or nearly so. This arrangement has the advantage of electrical symmetry which is important when the transducer is used with certain readout instrumentation. Also, the circuit of FIG. 4 makes it possible to employ a circuit calibration shunt 15 such that by closing key 18 a signal is produced on indicator 12 which corresponds to a fixed percentage of the output which the transducer would produce for a given load applied to the cell. Now in high precision work it is found that in order to preserve the accuracy of the shunt calibration given by 15, 18 over a given temperature range the value of modulus gage 5 may need to be increased or decreased somewhat, which in turn, requires a similar decrease or increase in gage 5'. This is awkward and time consuming if not altogether impractical with previous techniques.

In this embodiment of my invention I bring out of the transducer casing additional leads 19, 20 and apply external fixed shunts 16, 17 having (as previously explained) predetermined the sum of 5 and 5' to overcompensate for modulus if used alone. Then it becomes easy and practical to adjust at will the relative contributions of 5 and 5' to the modulus compensation and thus to adjust the accuracy of shunt calibration given by 15, 18 over the desired temperature range, while still providing the required modulus compensation of the transducer. Element 7, 7' are fixed resistors for adjusting the full-scale calibration of the device; preferably they are made equal or nearly so in order to preserve symmetry. Resistor 11 adjusts the terminal resistance at the power source to the desired value.

Figure 5:
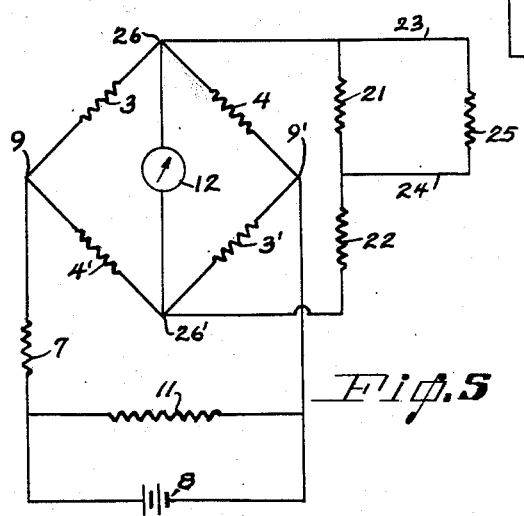
FIG. 5 is a modified arrangement of the modulur compensating means.

It should be noted in passing that while I have explained the principles in terms of a modulus compensating gage having a positive temperature coefficient of resistance and connected in series with the power source, the same effect can be obtained by the arrangement shown in FIG. 5 as it would be adapted to the various modifications. Here, a "modulus gage" 21, in series with fixed resistor 22 as may be required, is connected in shunt across the output terminals of the bridge, element 21 having a negative temperature coefficient of resistance. In this embodiment of my invention, I bring out leads 23, 24 and apply a fixed resistor 25 as a shunt in order to adjust the modulus compensation to the desired accuracy. Of course, this and the type of modulus compensation shown in FIGS. 2, 3, 4 can be employed simultaneously if desired, and any or all of the corresponding modulus gages may be provided with external shunts for modulus adjustment.

Alternatively, I can accomplish the same result by omitting element 25 and providing the proper fixed resistance 22 to reduce the overcompensation that would be provided by 21 alone. In other words, I can do all the adjustment with proper choice of 22 or all with proper choice of 25 with 22 made zero resistance, or I can use both 22 and 25, all with equal effectiveness. Normally, I prefer to use both 22 and 25 as a convenient arrangement.

It is further to be noted that the present invention deviates sharply from the prior art in that formerly the modulus gage was predetermined so as to undercompensate and additional modulus compensation was then added in series, whereas my invention resides in the deliberate predetermination of the modulus gage so as to overcompensate and then to bring out leads so that the overcompensation can be reduced to a desired magnitude by means of an external fixed shunt.

Although in the foregoing discussion I have for the sake of clarity consistently treated the "modulus" compensation as if the condition-responsive output of the network initially increases with increasing temperature, it will be seen that the same principles may be successfully applied for compensation of opposite character. Thus, it may be desired to deliberately cause the output of a responsive network to increase with increasing temperature by some chosen amount in order to compensate for the temperature error of an instrument or measuring circuit. Or, the network may initially be such that its condition-responsive output decreases with increasing temperature, and the compensation is used to correct for such decrease.

In such cases it is only necessary for elements 5, 5' (FIGS. 3 and 4) to have a negative thermal coefficient of resistance, preferably fairly large in magnitude, or element 21 (FIG. 5) would have to have a positive coefficient of resistance.

Furthermore, while I have preferably used a resistance type condition-responsive strain gage in a transducer as an example, it is to be understood that many other types of condition-responsive elements may be employed, such as variable inductance and/or capacity. Also, a wide range of transducers may be compensated in accordance with the teaching of this invention, such as fluid pressure cells, torquemeters, accelerometers, and many others.

From the above disclosure it can be seen that in all of my arrangements as illustrated in FIGS. 3, 4 and 5 (FIG. 2 being the prior art) I broadly provide apparatus for adjusting to a desired value the effect of temperature upon the output of an electrical network in response to a condition to be measured. The network includes at least one impedance element, which varies in accordance with the variation of the condition. The networks are shown specifically, for convenience of illustration, in the form of Wheatstone bridges and each network contains a strain gage 3 which changes its impedance in response to the condition (load) to be measured. Each network (FIG. 3 for example) has two input terminals 9, 9' and two output terminals 26, 26'. A source of voltage 8 is impressed upon the input terminals, and an indicating device 12 (which broadly includes recording, or controlling) is connected to the output terminals for the purpose of measuring the magnitude of the condition (load).

A temperature-sensitive resistor (5, in FIG. 3; 5 or 5' in FIG. 4; 21 in FIG. 5) is connected to the responsive network so that the resistor alone would cause a variation in load-responsive output as the temperature varies. This variation in load-responsive output is predetermined to be in excess of what is desired. This resistor is placed at or near the location where the temperature condition is to control the compensation. In FIG. 1 it is located on the base so as to "sense" the approximate temperature of the strain gage element. Means (lead wires 13, 13' in FIG. 3; 19, 19' or 20, 20' in FIG. 4; 23 and 24 in FIG. 5) are provided for connecting a fixed resistance shunt (14 in FIG. 3; 16 or 17 in FIG. 4; 25 in FIG. 5) in parallel with the temperature-sensitive resistor, the shunt being of such resistance value as to reduce the effect of temperature on the output from the predetermined excess to the desired value.

Because of my improved apparatus I am able to obtain all of the desirable results previously set forth herein.

It will of course be understood that various changes in details of construction and arrangement of parts may be made by those skilled in the art without departing from the spirit of the invention as set forth in the appended claims.

What I claim as new and desire to secure by Letters Patent of the United States is:

1. Condition-responsive apparatus having a desired relation between the temperature at a given location and the response of an electrical network to a condition to be measured comprising, in combination, an electrical network including at least one electrical impedance element whose impedance varies in accordance with the variation of the condition to be measured, said network having two input and two output terminals, a source of voltage impressed upon said input terminals whereby a variation of said condition results in a corresponding variation in the voltage appearing across said output terminals, two temperature-sensitive impedance elements which undergo change in electrical impedance with temperature, said electrical impedance elements being connected to said network so that said change in impedance effects a corresponding change in said response of the electrical network to a condition to be measured, each of said temperature-sensitive elements being so located as to experience substantially the temperature at said given location and having their changes in impedance with temperature predetermined to be in excess of those required for obtaining said desired relation, two substantially constant impedance elements and means connecting each of said substantially constant impedance elements in parallel with a different one of said temperature-sensitive elements as a shunt, said shunts being of such impedance values as to reduce the extent by which the predetermined changes in impedance of said temperature-sensitive elements effect said corresponding change in said network response to obtain said desired relation, and further characterized in that said network comprises a bridge circuit, said two temperature-sensitive impedance elements are connected in series with each other and with the source of voltage and the input terminals of the network, said network thereby being connected interposed between said two temperature-sensitive elements having the two shunts connected therewith so that the relative contributions of the two temperature-sensitive elements to the reduction of said extent can be established separately as desired, and a substantially constant impedance calibration element is provided together with means for termporarily connecting it across one of said output terminals and one terminal of said source of voltage so as to provide purely electrical means of producing a network output which can be calibrated in terms of said condition to be measured, said calibration element being thereby connected in parallel with the combination of one arm of said bridge circuit and one of said temperature-sensitive impedance elements taken in series, whereby the effect of temperature upon the output produced by operation of said calibration element can be varied by selecting the impedance of said substantially constant impedance element shunting said last-named temperature-sensitive element so that the network output produced by said electrical means can be made substantially independent of temperature while the net contribution of both temperature-sensitive elements to the reduction of said extent can be established to obtain said desired relation by selecting the impedance of said substantially constant impedance element shunting the remaining temperature-sensitive element.

2. The method of producing precise condition-responsive apapratus of the type having an electrical network including at least one electrical impedance element the impedance of which varies in accordance with a condition to be measured at a given location where the condition response is subject to temperature-induced variations, said apparatus including means for impressing input voltages upon said network and including output terminals exhibiting electrical signals characterizing the measured condition, which comprises positioning at said location a selected temperature-sensitive impedance which undergoes changes in electrical impedance with temperature and which has a predetermined impedance at a given temperature, connecting the temperature-sensitive impedance with the network in circuit relationship to modify the signals exhibited at said output terminals in accordance with changes in impedance of said temperature-sensitive impedance, said temperature-sensitive impedance being located externally of said network, selecting a magnitude of said predetermined impedance which produces a testing relationship between the electrical signals exhibited at the output terminals and the values of the condition to be measured which is in excess of a desired calibration relationship, producing at least two different temperatures at said location, measuring the said excess of the testing relationship over the calibration relationship at the different temperatures, and adding in parallel circuit relationship with said temperature-sensitive impedance an impedance unit having an electrical impedance which is substantially constant over a range of temperatures to which the apparatus is intended to be exposed and which reduces the relationship between said signals and said values of the condition to be measured substantially to said desired calibration relationship.

3. The method, as set forth in claim 2, of producing precise condition-responsive apparatus of the type having an electrical network in the form of a bridge circuit with electrical impedances in the form of strain gages mounted on a condition-sensing element, which method comprises positioning at said location two such selected temperature-sensitive impedances, connecting each of the two temperature-sensitive impedances serially with a different one of the input terminals of said bridge circuit and in series with said means for impressing voltages and with the other of said temperature-sensitive impedances, wherein said selecting step involves selecting the predetermined impedances of said temperature-sensitive impedances to have a serially-combined impedance equal to said predetermined impedance, and wherein said adding step involves adding in parallel circuit relationship with each of said temperature-sensitive impedances a different impedance unit having an electrical impedance which is substantially constant over said range of temperatures, whereby to reduce the relationship between said signals and said values of the condition to be measured substantially to said desired calibration relationship.

4. The method of producing precise condition-responsive apparatus of the type having an electrical bridge network including at least one electrical impedance element the impedance of which varies in accordance with a condition to be measured at a given location where the condition response is subject to temperature-induced variations, said apparatus including means for impressing input voltages upon two input terminals of said bridge network and including two output terminals exhibiting electrical signals characterizing the measured condition, which comprises positioning at said location two selected temperature-sensitive impedances which undergo changes in electrical impedance with temperature, connecting the temperature-sensitive impedances in series with each other and with the means for impressing voltage and with the input terminals of the bridge network to modify the signals exhibited at said output terminals in accordance with changes in impedance of said temperature-sensitive impedance, said bridge network input terminals being located between the temperature-sensitive impedances, selecting said temperature-sensitive impedances to have changes in impedance with temperature which together are predetermined to be in excess of changes required for obtaining a desired relationship between the output of the bridge network and the temperature at the given location, adding in parallel circuit relationship with each of said temperature-sensitive impedances a different shunt impedance unit having electrical impedance which is substantially constant over a range of temperatures to which the apparatus is intended to be exposed, temporarily connecting a susbtantially constant impedance calibration element in parallel with the series combination of one arm of the bridge network and one of the two temperature-sensitive impedances so as to provide purely electrical means of producing a bridge network output which can be calibrated in terms of the condition to be measured, selecting the impedance of the substantially constant impedance shunt unit in parallel with said one of the two temperature-sensitive impedances to establish a bridge network output which is substantially independent of temperature, and selecting the impedance of the substantially constant impedance shunt in parallel with the other of the two temperature-sensitive impedances to reduce the extent by which the changes in impedances of both temperature-sensitive impedances vary the output of the bridge network and, thereby, to produce a desired relation between the output of the bridge network and the temperature at the given location.

No references cited.

RICHARD C. QUEISSER, *Primary Examiner.*